C. A. GALE.
Photographic-Printing Frame for Solar Printing.
No. 223,128. Patented Dec. 30, 1879.
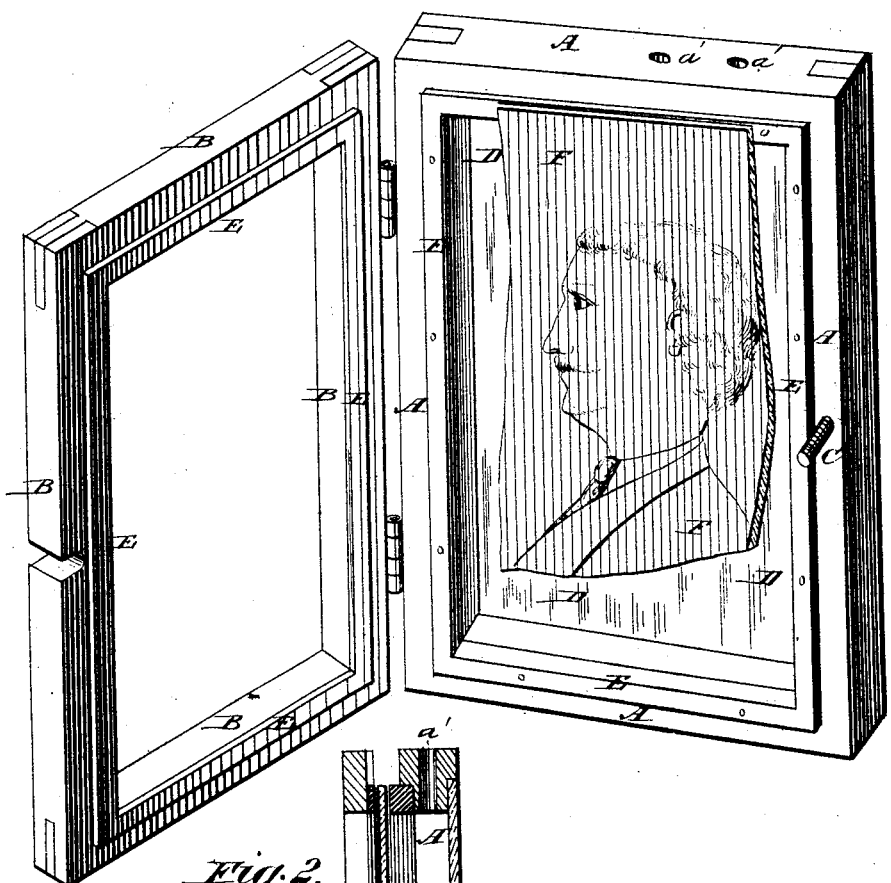
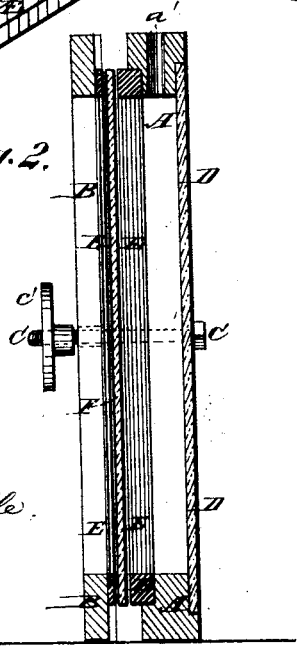

UNITED STATES PATENT OFFICE.

CHARLES A. GALE, OF PIQUA, OHIO.

IMPROVEMENT IN PHOTOGRAPHIC PRINTING-FRAMES FOR SOLAR PRINTING.

Specification forming part of Letters Patent No. 223,128, dated December 30, 1879; application filed May 7, 1879.

*To all whom it may concern:*

Be it known that I, CHARLES ALVIN GALE, of Piqua, in the county of Miami and State of Ohio, have invented a new and useful Improvement in Photographic Printing Apparatus, of which the following is a specification.

Figure 1 is a perspective view of my improved apparatus, shown open, and with part of the negative broken away to show the construction. Fig. 2 is a vertical section of the same closed.

Similar letters of reference indicate corresponding parts.

The object of this invention is to furnish an improved apparatus for taking solar prints from negatives which shall be simple in construction and convenient and effective in use, giving a clear brilliant picture, free from marks and scratches, and requiring no retouching, and which will allow the negative to be afterward used for contact-printing when desired.

The invention consists in the combination of the two frames, hinged to each other at one edge, and provided at the other edge with a bolt and hand-nut, or equivalent clamp, the glass plate, and the packing-strips with each other, to adapt the apparatus to receive and hold a negative, and glycerine, or equivalent fluid, for solar printing, as hereinafter fully described.

A and B are two frames, of wood or other suitable material, which are made of any required length and breadth, and half an inch (more or less) in depth. The frames A B are hinged to each other at one side, and to the other side of the frame A is attached a bolt, C, which passes through a hole or notch in the other side of the frame B, and has a hand-nut, $c'$, screwed upon it.

The bolt and nut C $c'$ may be replaced by any other suitable clamp.

D is a plate of clear glass, which is let into the outer side of the frame A, and secured in place water-tight. To the adjacent sides of the frames A B are secured packing-strips E, of rubber or other pliable material, to rest against the negative F and prevent it from being broken when clamped between the two frames.

In using the apparatus the negative F is firmly clamped between the packings E of the two frames A B, with its collodion and retouched side toward the glass plate D. The space between the glass plate D and the negative F is filled through the hole $a'$ in the top of the frame A with glycerine or other suitable fluid. The apparatus is then placed in a solar camera, and the retouched negative F is printed from in the usual way.

By this arrangement all waves, marks, scratches, and other unevenness in the surface of the negative that would affect the rays of light are filled up by the glycerine, so that the pictures will be brilliant and clear in their shadows and pure in the high lights, and will preserve exactly the effect of the artist's retouching.

Having thus described my invention, I claim as new and desire to secure by Letters Patent—

The combination of the frames A B, hinged to each other at one edge, and provided at the other edge with a bolt and hand-nut, C $c'$, or equivalent clamp, the glass plate D, and the packing-strips E with each other, to adapt the apparatus to receive and hold a negative, F, and glycerine or equivalent fluid for solar printing, substantially as herein shown and described.

CHARLES ALVIN GALE.

Witnesses:
CHAS. F. CLARKSON,
S. A. CARVIN.